United States Patent
Rivas-Sanz

(10) Patent No.: US 12,381,417 B2
(45) Date of Patent: Aug. 5, 2025

(54) NANO-SCALE ELECTROMAGNETIC INDUCTANCE CELLS, ARRAYS FORMED THEREOF, AND USES THEREOF

(71) Applicant: Raul Eduardo Rivas-Sanz, New York, NY (US)

(72) Inventor: Raul Eduardo Rivas-Sanz, New York, NY (US)

( * ) Notice: Subject to any disclaimer, the term of this patent is extended or adjusted under 35 U.S.C. 154(b) by 0 days.

(21) Appl. No.: 18/215,186

(22) Filed: Jun. 28, 2023

(65) Prior Publication Data

US 2024/0014686 A1 Jan. 11, 2024

Related U.S. Application Data

(60) Provisional application No. 63/358,290, filed on Jul. 5, 2022.

(51) Int. Cl.
*H02J 50/00* (2016.01)
*H02N 11/00* (2006.01)

(52) U.S. Cl.
CPC .......... *H02J 50/001* (2020.01); *H02N 11/002* (2013.01)

(58) Field of Classification Search
CPC ..... H02J 50/001; H02N 11/002; H02K 16/00; H02K 35/02; H02K 35/04
See application file for complete search history.

(56) References Cited

U.S. PATENT DOCUMENTS

| | | | | |
|---|---|---|---|---|
| 9,698,663 | B2* | 7/2017 | Jeong | H02K 44/00 |
| 9,780,698 | B2* | 10/2017 | Lee | H02N 2/188 |
| 11,724,933 | B2* | 8/2023 | Heller | B81C 1/00261 |
| | | | | 257/704 |
| 2004/0239210 | A1* | 12/2004 | Pinkerton | H02K 33/18 |
| | | | | 310/309 |
| 2005/0104085 | A1* | 5/2005 | Pinkerton | B82Y 30/00 |
| | | | | 257/288 |
| 2005/0179339 | A1* | 8/2005 | Pinkerton | H02K 33/18 |
| | | | | 977/731 |
| 2007/0241470 | A1* | 10/2007 | Haisch | H02N 11/002 |
| | | | | 264/1.27 |
| 2011/0074162 | A1* | 3/2011 | Cottone | H02N 2/186 |
| | | | | 290/1 R |
| 2015/0303786 | A1* | 10/2015 | Jeong | F01D 1/00 |
| | | | | 310/11 |
| 2016/0173006 | A1* | 6/2016 | Lee | H02N 2/22 |
| | | | | 310/317 |
| 2020/0251973 | A1* | 8/2020 | Kim | H02K 3/02 |
| 2021/0135600 | A1* | 5/2021 | Thibado | B81B 3/007 |

* cited by examiner

*Primary Examiner* — Jared Fureman
*Assistant Examiner* — Michael J Warmflash

(57) ABSTRACT

The present disclosure provides a nano-scale electromagnetic inductance cell comprising at least one permanent magnet and at least one solenoid held within a container filled with a liquid medium with one of the two being suspended in the medium and free to move, generating energy by Brownian motion within suitable ambient temperature ranges. The disclosure further provides an array of such cells for generating electricity on larger scales and use of the disclosed cells and arrays for generating electricity.

7 Claims, 2 Drawing Sheets

NANO-SCALE ELECTROMAGNETIC INDUCTANCE CELLS, ARRAYS FORMED THEREOF, AND USES THEREOF

FIELD OF INVENTION

The present invention relates generally to the field of energy production. More specifically, the present invention relates to apparatus for converting nano-scale Brownian motion to electrical power and uses thereof.

BACKGROUND

The use of the phenomenon of electromagnetic inductance to generate electricity by relative motion between a circuit comprising a solenoid comprising one or more loops and a permanent magnet based on Faraday's law of induction is well known and widely used in various kinds of generators.

While such electromagnetic inductance cells are widely used in the modern day, they are limited by the relatively large kinetic forces and motion required to cause relative movement between the permanent magnet and the solenoid. Some solutions have attempted to harness the motion of ocean waves to generate free electricity and have met with success, but deployment is expensive and such large motion often wears the apparatus down quickly.

Brownian motion, or pedesis, is the random motion of particles suspended in a medium (a liquid or a gas). This pattern of motion typically consists of random fluctuations in a particle's position inside a fluid sub-domain, with occasional transitions to another sub-domain. Each relocation is followed by more fluctuations within the new sub-domain. This pattern describes a fluid at thermal equilibrium, defined by a given temperature. Within such a fluid, there exists no preferential direction of flow. More specifically, the fluid's overall linear and angular momenta remain null over time. The kinetic energies of the molecular Brownian motions, together with those of molecular rotations and vibrations, sum up to the caloric component of a fluid's internal energy.

Brownian motion, which is powered by the kinetic vibrations of the fluid medium at an ambient temperature, occurs over very small distances and is thus not useful for causing significant relative motion between a permanent magnet and a solenoid at any kind of normal scale. However, the motion can generate significant relative motion at a nano-scale level.

As Brownian motion is ubiquitous and requires no external driver other than an ambient temperature and lack of a vacuum, an apparatus capable of harnessing such motion in an electromagnetic inductance cell could effectively generate free electricity.

It is within this context that the present invention is provided.

SUMMARY

The present disclosure provides a nano-scale electromagnetic inductance cell comprising at least one permanent magnet and at least one solenoid held within a container filled with a liquid medium with one of the two being suspended in the medium and free to move, generating energy by Brownian motion within suitable ambient temperature ranges. The disclosure further provides an array of such cells for generating electricity on larger scales and use of the disclosed cells and arrays for generating electricity.

Thus, according to one aspect of the present disclosure there is provided a nano-scale electromagnetic inductance cell for generating electricity, the cell comprising a container filled with a liquid medium in which at least one nano-scale permanent magnet is suspended, and further comprising a circuit having positive and negative terminals exterior to the container and at least one solenoid within the container which is affixed in a stable position relative to the container walls such that any motion of the one or more permanent magnets causes relative motion between the at least one magnet and the at least one solenoid.

According to another aspect of the present disclosure, there is provided a nano-scale electromagnetic inductance cell for generating electricity, the cell comprising a container filled with a conductive liquid medium in which at least one nano-scale solenoid is suspended, and further comprising at least one permanent magnet within the container which is affixed in a stable position relative to the container walls such that any motion of the one or more solenoids causes relative motion between the at least one magnet and the at least one solenoid, and further comprising a circuit having positive and negative terminals in the conductive medium within the container.

In either embodiment, the circuit portion may connect to and direct current to an external load, thereby acting as a power source.

According to another aspect of the present disclosure, there is provided an array of nano-scale electromagnetic inductance cells according to the above-described embodiments, wherein each of the cells is connected to a common external load as a power source.

In some embodiments of the array, the cells are connected in parallel.

In other embodiments of the array, the cells are connected in series.

Finally, according to another aspect of the present disclosure, there is provided a use of a cell or an array according to the above-described embodiments to generate electricity.

BRIEF DESCRIPTION OF THE DRAWINGS

Various embodiments of the invention are disclosed in the following detailed description and accompanying drawings.

Figure 1:
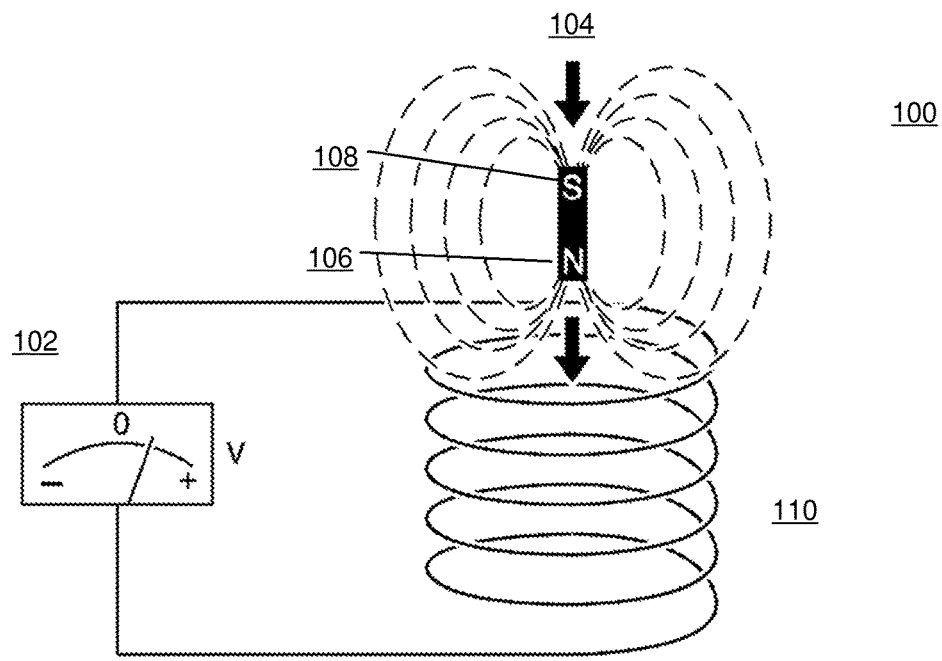
FIG. 1 illustrates an example configuration of a conventional electromagnetic inductance cell connected to an external load, in this case a voltmeter.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention.

The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting of the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Referring to FIG. 1, an example configuration of a conventional electromagnetic inductance cell 100 connected to an external load 102, in this case a voltmeter, is shown.

A permanent magnet 104 having a north pole 106 and a south pole 108 moves towards a coiled solenoid 110 connected to the voltmeter 102. This type of coiled solenoid is widely used for such applications because the stacked loops of the structure interact to emulate the magnetic field of the permanent magnet 104, maximizing the inductance caused by the relative motion between the solenoid 110 and the magnet 104.

The interacting magnetic fields energize the electrons in the looped wire of the solenoid 110 and induce a current that travels in a direction which is dependent on the orientation of the poles of the permanent magnet 104 with respect to the solenoid 110. If the permanent magnet 104 were moving in an opposing direction or the poles were aligned oppositely then a negative voltage would be detected on the voltmeter 102.

Figure 2:
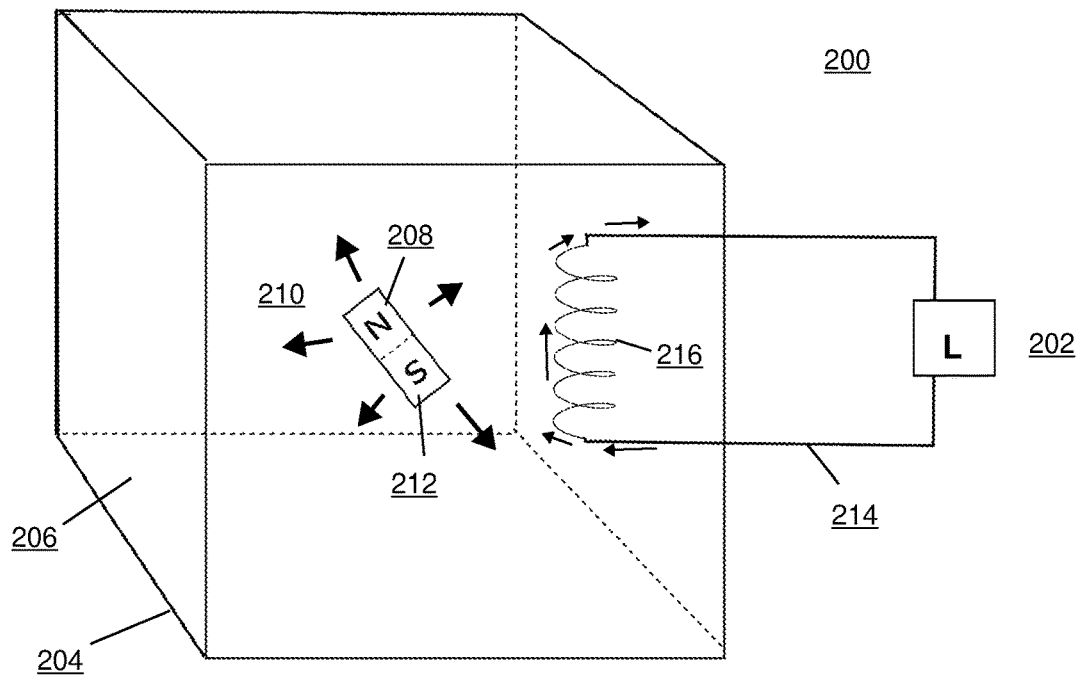
FIG. 2 illustrates a first example configuration of a nano-scale electromagnetic inductance cell connected to an external load according to the present disclosure.

Referring to FIG. 2, a first example configuration of a nano-scale electromagnetic inductance cell 200 connected to an external load 202 according to the present disclosure is shown.

The cell 200 comprises a container 204 that is filled with a fluid medium 206, and has suspended in that fluid medium at least one permanent magnet 208 having a north pole 210 and a south pole 212 and which is free to float and move about within the medium 206. A circuit 214 connected to the external load 202 comprises a solenoid 216 which is held within the container at a fixed position relative to the walls of the container such that any motion of the permanent magnet 208 becomes relative motion with respect to the solenoid 216.

The nano-scale electromagnetic inductance cell of FIG. 2 operates on the same basic principles as that of FIG. 1 with the exception that, due to the size of the permanent magnet and its suspension within a fluid medium, the magnet will undergo Brownian motion (within certain temperature ranges) within the fluid medium that will cause sufficient relative motion between the magnet 208 and the solenoid 216 to generate a small amount of current.

The cell is intended to produce electricity by harvesting the kinetic energy from the Brownian motion of the permanent magnet 208 within the fluid medium 206 at an ambient temperature. The fluid medium 206 should thus be of a viscosity that allows the magnet 208 to move freely at an ambient temperature close to room temperature, i.e. 20 degrees Celsius. The actual temperature range within which the cell 200 can function will depend on the specific dimensions and materials of its construction. The generation of current is likely to cause cooling of the fluid medium, since the kinetic energy is being harvested, however as long as the cell is not placed in a vacuum, an equilibrium with the surrounding environment will be reached by conduction and thermal diffusion.

For clarity, the permanent magnet 208 has been illustrated as a simple bar magnet and the solenoid 216 has been illustrated as a standard coiled solenoid, however various configurations of both magnet and solenoid are possible, the only requirement is that the solenoid have one or more loops and the magnet have a north pole and a south pole.

Furthermore, while illustrated as being to one side of the container 204 for clarity, it is likely that the solenoid 216 will take up a large portion of the interior of the container such that Brownian motion of the permanent magnet within the fluid medium is more likely to cause it to travel through one or more loops of the solenoid to generate the maximum amount of current.

In some examples the cell 200 may contain more than one magnet or more than one solenoid.

Figure 3:
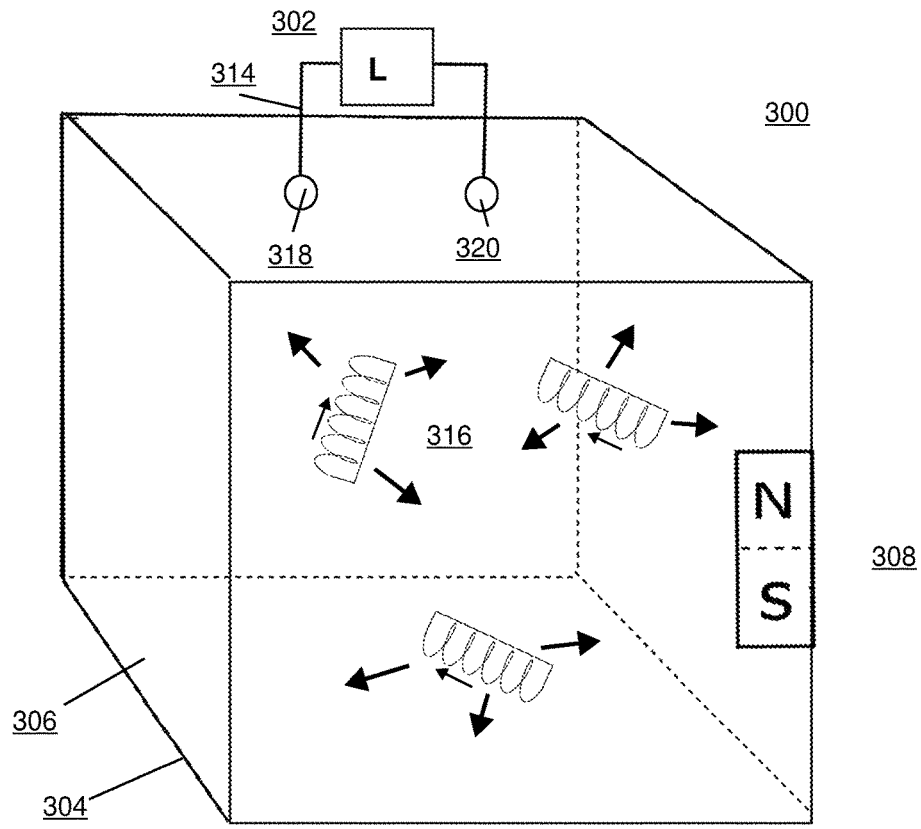
FIG. 3 illustrates a second example configuration of a nano-scale electromagnetic inductance cell connected to an external load according to the present disclosure.

Referring to FIG. 3, a second example configuration of a nano-scale electromagnetic inductance cell 300 is shown connected to an external load 302 according to the present disclosure.

As with the first example configuration, the cell comprises a container 304 filled with a fluid medium 306 and a circuit 314 connected to the external load.

The difference in this case is that the at least one permanent magnet 308 is affixed in a position inside the container and does not move relative to the container walls, and instead the fluid medium has suspended therein one or more floating solenoids 316 formed into one or more loops and each forming a complete circuit. It is thus the solenoids 316 that are affected by Brownian motion within the fluid medium, moving relative to the fixed position of the magnet and generating current within themselves.

The fluid medium 306 must be a conductive fluid, and the electrical current derived from the inductance is then picked up by positive 318 and negative 320 terminals of the circuit 314 connected to the external load.

The basic principles of operation are the same as those of the first configuration described with respect to FIG. 2, and as with the configuration of FIG. 2 the fixed portion, in this case the magnet, is not drawn to scale. In practice the magnet would be larger and take a more central position in the container 302.

Each cell constructed as disclosed in either configuration is capable of producing a small amount of electrical current for an indefinite amount of time without requiring any external motion or energy source other than an ambient temperature capable of producing Brownian motion of nanoparticles suspended in the fluid medium used.

As the amount of current produced per unit time is likely to be small, another aspect of the present disclosure is the provision of a structured array of such cells connected in parallel or series to positive and negative terminals of an external load.

Figure 4:
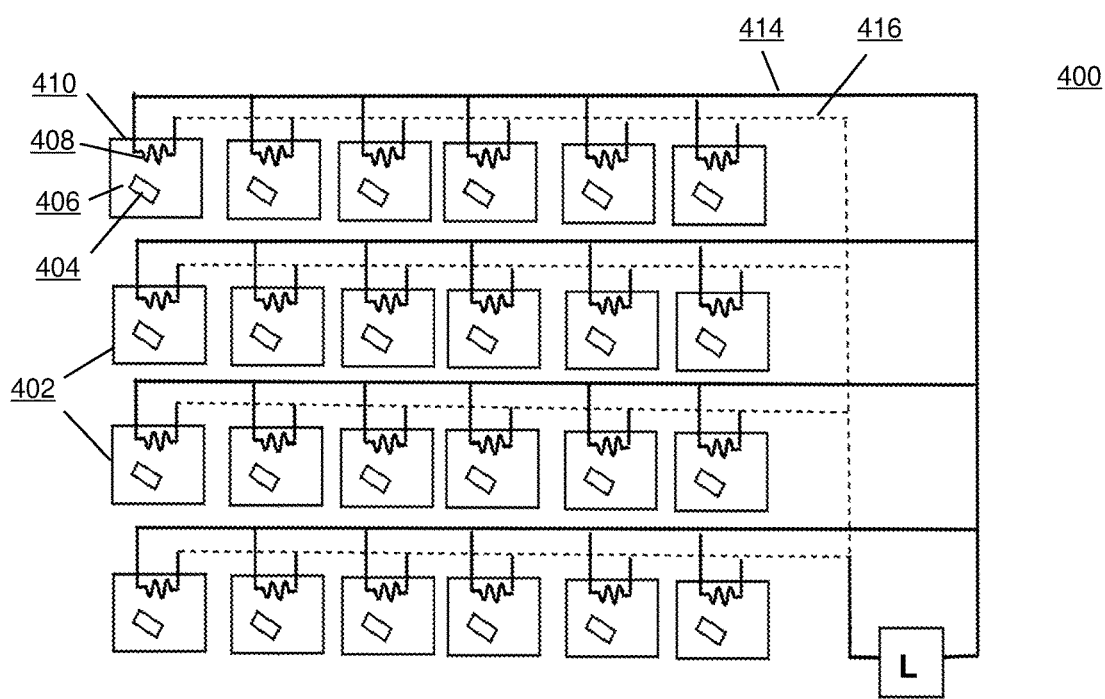
FIG. 4 illustrates an example configuration of an array of nano-scale electromagnetic inductance cells connected to an external load according to the present disclosure.

Referring to FIG. 4, an example configuration of such an array 400 is shown.

In the illustrated example, electromagnetic inductance cells 402 of the type of the first configuration described above with respect to FIG. 2 are used, wherein the at least one permanent magnet 404 of each cell is suspended in a fluid medium 406 and allowed to move with respect to a solenoid 408 that is affixed to the container 410 and connected to the circuit powering the external load 412.

In the illustrated configuration the cells are connected in series and arranged in parallel rows, each cell 402 having a common positive terminal connection 414 and a common negative terminal connection 416 to the external load 412. The cells may also be stacked vertically out of the page.

This is merely one example arrangement of such an array. As the technology develops, certain configuration and arrangements of the connections between the cells and the external load may be found to be more efficient or beneficial. For example, stacking the cells in shapes such as Platonic solids or regular Archimedean solids.

The only condition is that the containers of the cells in the array should each have at least one surface that is in contact with a surrounding medium or environment (e.g. air) such that a thermal equilibrium is maintained that keeps the cells in the array within an appropriate operating range.

Such arrays could be capable of continuously producing useful amounts of electrical current indefinitely using nothing more than Brownian motion derived from ambient temperature of surrounding air. The applications of such power sources are, obviously, vast, which is why the circuits disclosed herein have been described using the broad requirement of having an "external load".

An external load as defined herein encompasses any use of electrical power, including direct powering of electrical apparatus and storage means, i.e. charging of battery like apparatus.

Use of the disclosed cells and arrays for powering or charging any electrical circuit is thus also provided by the present disclosure. Some examples of use for the arrays include decentralised and semi-decentralised power grids, everlasting batteries for smart devices, powering electric vehicles, and medical devices such as electronic organs. Example uses of the single cells could be to power nanoscale robots.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the nanoscale electromagnetic inductance cells, and arrays and uses thereof have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A nano-scale electromagnetic inductance cell for generating electricity, the cell comprising a container filled with a liquid medium in which at least one nano-scale permanent magnet is suspended, and further comprising a circuit having positive and negative terminals exterior to the container and at least one solenoid within the container which is affixed in a stable position relative to the container walls such that motion conditioned at ambient temperature induces pedesis of the at least one nano-scale permanent magnets causing relative motion between the at least one nano-scale permanent magnet and the at least one solenoid.

2. A nano-scale electromagnetic inductance cell for generating electricity, the cell comprising a container filled with a conductive liquid medium in which at least one nano-scale solenoid is suspended, and further comprising at least one nano-scale permanent magnet within the container which is affixed in a stable position relative to the container walls such that motion conditioned at ambient temperature induces pedesis of the one or more solenoids causing relative motion between the at least one nano-scale permanent magnet and the at least one solenoid, and further comprising a circuit having positive and negative terminals in the conductive medium within the container.

3. A nano-scale electromagnetic inductance cell according to claim 1 or claim 2, wherein the circuit connects to and directs current to an external load as a power source.

4. An array of nano-scale electromagnetic inductance cells according to claim 1 or claim 2, wherein each of the cells is connected to a common external load as a power source.

5. An array according to claim 4, wherein the nano-scale electromagnetic inductance cells are connected in parallel.

6. An array according to claim 4, wherein the nano-scale electromagnetic inductance cells are connected in series.

7. Use of a nano-scale electromagnetic inductance cell according to claim 4 to generate electricity.

* * * * *